Jan. 6, 1970  D. R. GRANDON ET AL  3,487,498
MACHINE FOR REMOVING SAUSAGE CASING
Filed Aug. 3, 1967

INVENTORS
DONALD R. GRANDON
RICHARD P. NELSON
BY Carl C. Batz
ATTORNEY

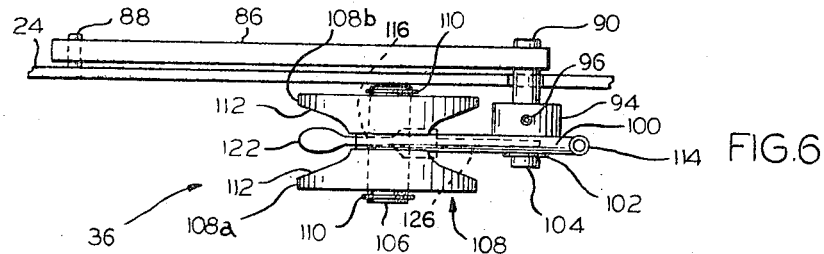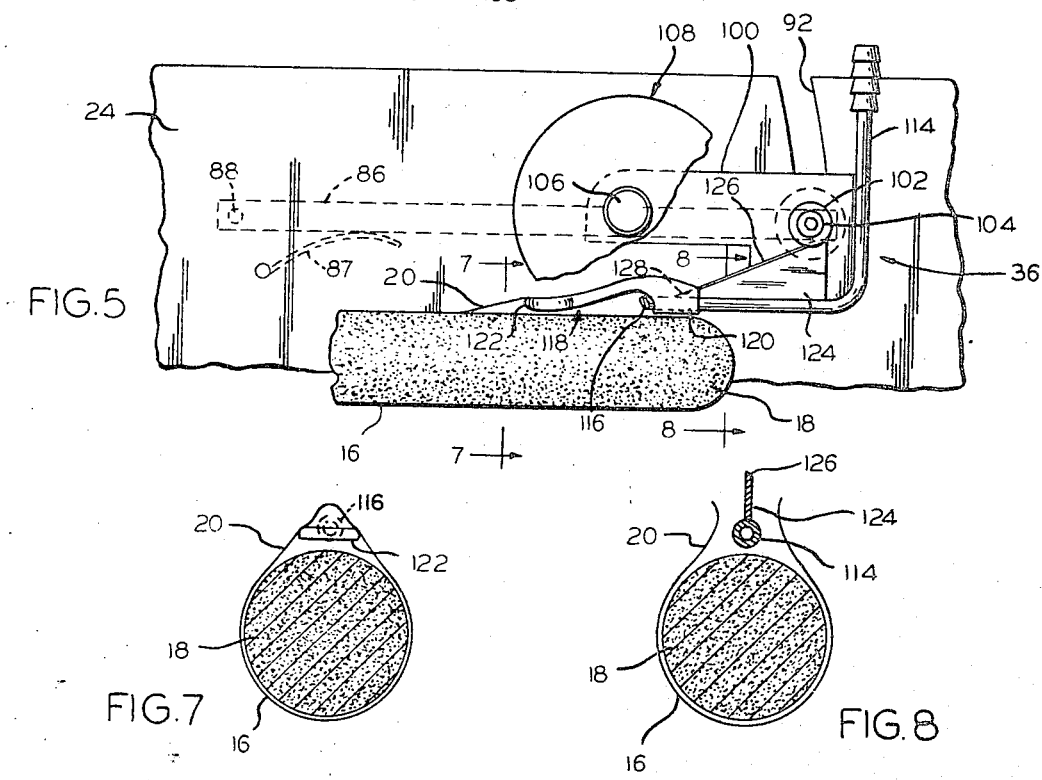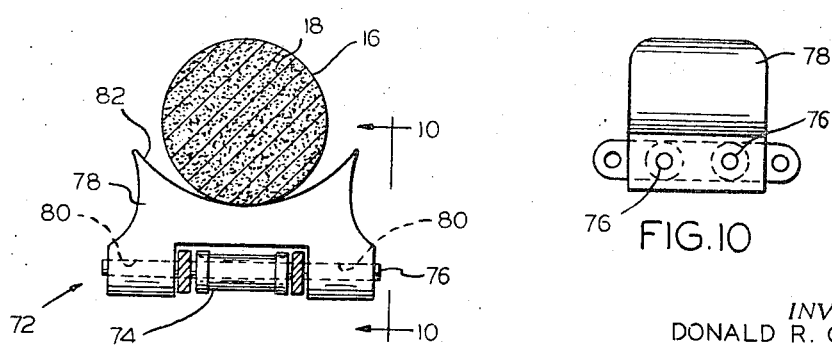

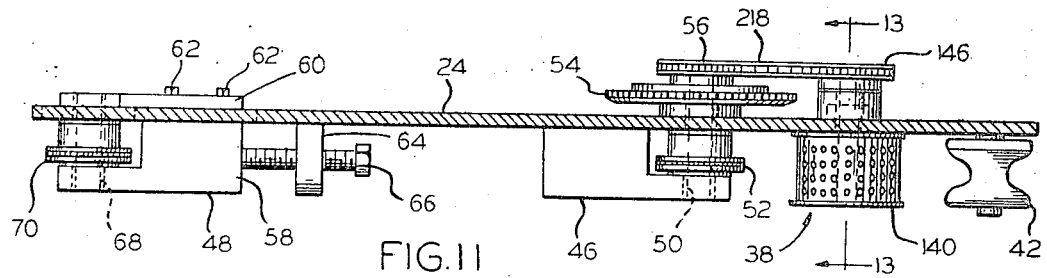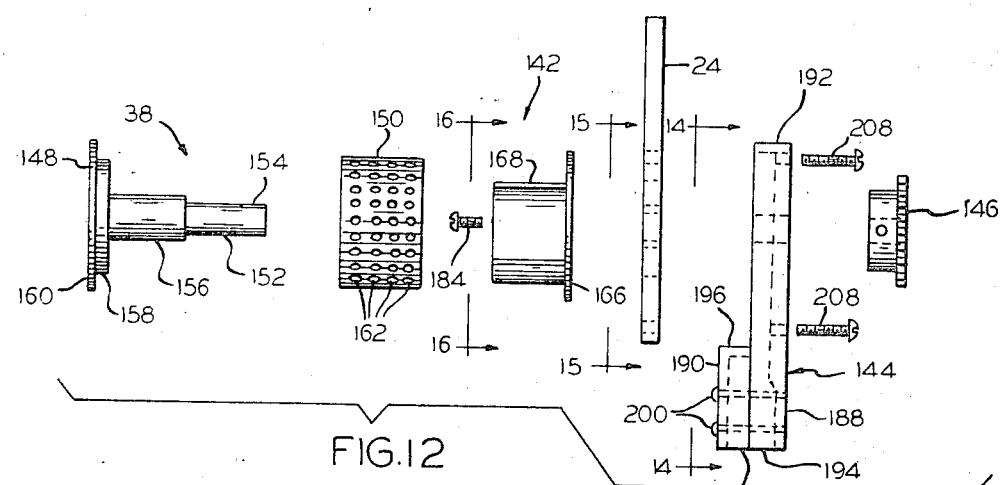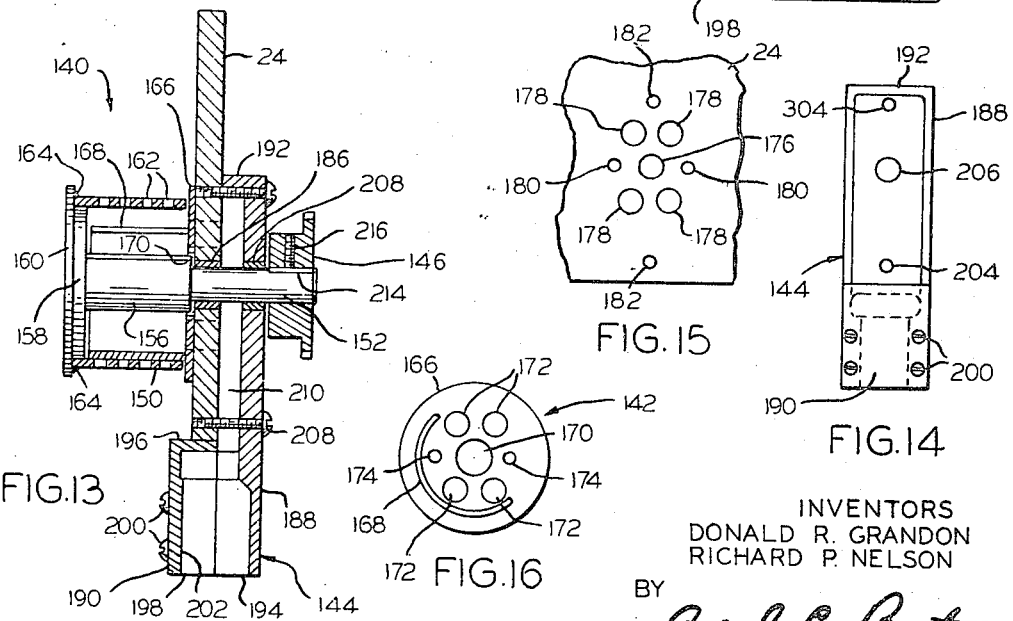

United States Patent Office 3,487,498
Patented Jan. 6, 1970

3,487,498
MACHINE FOR REMOVING SAUSAGE CASING
Donald R. Grandon, Overland Park, Kans., and Richard P. Nelson, Kansas City, Mo., assignors to Armour and Company, Chicago, Ill., a corporation of Delaware
Filed Aug. 3, 1967, Ser. No. 658,256
Int. Cl. A22c 13/00
U.S. Cl. 17—1
6 Claims

ABSTRACT OF THE DISCLOSURE

A machine for removing the casing from a linked strand of sausages enclosed in a separable casing, the machine comprising casing separator means including a frame member pivotally mounted on the machine and a roller on one end of the frame member adapted to support the same on the strand. Fixed to the frame member subjacent the roller is a casing separator including an air nozzle and a spoon projecting through a peripheral groove in the roller whereby upward movement of the roller results in like movement of the air nozzle and spoon.

---

This invention relates to a machine for removing the casing from a linked strand of sausages enclosed in a separable casing. More particularly, the invention relates to a machine of the type that separates the casing from the sausages, splits the separated casing longitudinally, and removes the split casing from the sausages as the strand is propelled longitudinally.

Sausage products such as frankfurters are produced by stuffing a comminuted meat mixture into long lengths of a suitable casing such as tubular cellulose film. The resulting strands subsequently are linked or divided into sections, smoked, cooked, and cooled. Thereafter, the casing is removed from the sausages. Previously, machines of the above-described type have been provided for removing the casing, such as described in U.S. Patent Nos. 2,725,591, 2,757,409, and 2,757,410. Other types of machines for removing the casing are described in U.S. Patent Nos. 2,463,157 and 2,636,213, for example.

It is highly desirable for large scale production that the sausage casing be removed in a continuous operation. Apparatus previously available was not well suited for continuous operation. In particular, the apparatus frequently did not function properly, and the sausages were scored excessively.

The present invention provides a simplified machine for removing sausage casing which is employed in continuous operation with greater reliability and reduced sausage damage. An improved structural combination is provided for separating the casing from the sausages, splitting the separated casing, and removing the casing from the sausages. New and improved machine components are provided, including novel separating apparatus and novel vacuum removal apparatus.

A preferred embodiment of the new machine for removing sausage casing is illustrated in the drawings, wherein like parts are identified by like reference symbols in each of the views, and wherein:

FIG. 5 is a further enlarged fragmentary side elevational view of the machine, with parts broken away, particularly illustrating a casing separator assembly;

FIG. 6 is a top plan view of the apparatus illustrated in FIG. 5 on a smaller scale;

Figure 2:
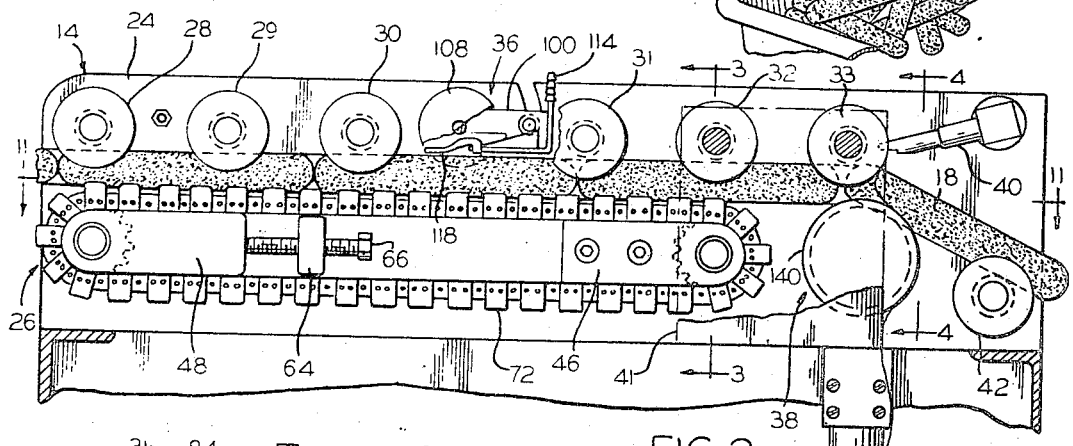
FIG. 2 is an enlarged fragmentary side elevational view of the machine, with parts broken away.
Figures 3, 4:
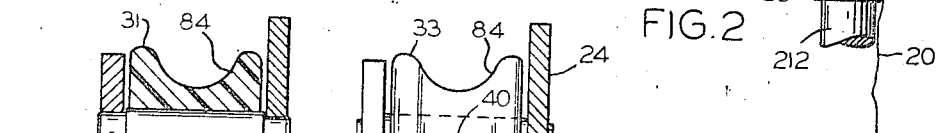
FIG. 3 is a further enlarged fragmentary cross sectional view of the machine, taken on line 3—3 of FIG. 2.
FIG. 4 is a similarly enlarged fragmentary cross sectional view of the machine, taken on line 4—4 of FIG. 2.

FIGS. 7 and 8 are further enlarged cross sectional views of the apparatus of FIG. 5, taken respectively on lines 7—7 and 8—8 thereof, illustrating the manner in which a casing is separated from the sausages and then split;

FIG. 9 is an enlarged cross sectional view of a conveyor belt in the machine and a sausage strand thereon, as also shown on a smaller scale in FIG. 3;

FIG. 10 is a side elevational view of a conveyor belt section, taken on line 10—10 of FIG. 9;

FIG. 11 is a longitudinal sectional view of the machine, with parts removed, taken on line 11—11 of FIG. 2;

FIG. 12 is an exploded end elevational view of vacuum casing removal apparatus in the machine;

FIG. 13 is an enlarged cross sectional view of the casing removal apparatus, taken on line 13—13 of FIG. 11;

FIG. 14 is a side elevational view of a vacuum chamber in the casing removal apparatus, taken on line 14—14 of FIG. 12;

FIG. 15 is a fragmentary side elevational view of a side plate, taken on line 15—15 of FIG. 12; and FIG. 16 is a side elevational view of a vacuum breaker in the casing removal apparatus, taken on line 16—16 of FIG. 12.

Figure 1:
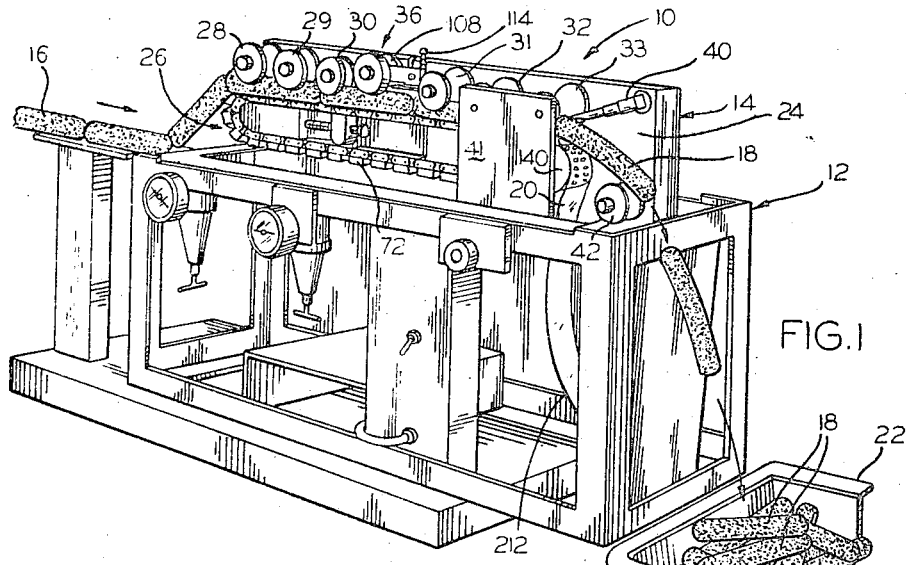
FIGURE 1 is a perspective view of the machine.

Referring to the drawings, particularly FIGS. 1 and 2, the sausage casing removal machine 10 includes a base frame 12 and a peeler head 14 mounted thereon. The peeler head receives a linked strand or string 16 of sausages 18 enclosed in a separable casing 20 from a suitable source, such as a sausage linking machine. Apparatus in the head propels the sausage strand longitudinally, separates the casing from the sausages, splits the separated casing longitudinally, removes the split casing from the sausages, and discharges the sausages into a receptacle 22. Alternatively, the sausages may be discharged onto a suitable conveyor.

The peeler head includes a side plate 24 and a conveyor 26 mounted on the side plate and extending therealong. Contoured idler rollers 28–33 are mounted on the side plate in spaced relation therealong, and they are spaced above the conveyor at the same elevation. The rollers include four pressure rollers 28–31 above the conveyor, a guide roller 32 above the inner end of the conveyor, and a guide roller 33 beyond the inner end of the conveyor. A casing separator assembly 36 is mounted on the side plate between the pressure rollers 30 and 31, at about the center of the conveyor and spaced thereabove. Casing removal apparatus 38 is mounted on the side plate beyond the conveyor and spaced below the guide roller 33. A casing spreader air nozzle 40 is mounted on the side plate beyond and adjacent to the guide roller 33, and spaced above the removal apparatus. A shield 41 is mounted on the outer sides of the removal apparatus and the nozzle, in parallel to the side plate. A contoured discharge idler roller 42 is mounted on the side plate beyond the removal apparatus.

Referring particularly to FIGS. 3, 4 and 9–11, the conveyor 26 includes a fixed bearing block 46 and an adjustable bearing block 48 mounted in longitudinally spaced relation on the side plate 24. A drive shaft 50 is journaled in the fixed bearing block and extends through the side plate, and a conveyor drive sprocket 52 is secured on the shaft. A main drive sprocket 54 and a coupling sprocket 56 are mounted on the shaft on the back side of the plate. The adjustable bearing block 48 includes components 58 and 60 on the front and back sides of the plate, adjustably secured together on the plate by screws 62. A lug 64 is mounted on the plate adjacent to and spaced from one block component 58, and an adjusting screw 66 extends through the lug in threaded engagement therewith and bears on the block component 58. An idler shaft 68 is journaled in the adjustable block, and a conveyor sprocket 70 is secured on the shaft.

A conveyor belt 72 (Ty-Linker belt) is trained over the conveyor drive and idler sprockets 52 and 70. The belt includes an endless link chain 74 having elongated link pins 76 extending from opposite sides thereof. Carrying elements 78 bridge the chain and are mounted on the extending portions of the pins 76. Two adjacent pins are received in a pair of openings 80 on each side of each element. The elements are constructed of rubber or other suitable material, and each is provided with an arcuate concave carrying surface 82 conforming generally to the contour of the strand 16. The concave surfaces of the carrying elements provide a discontinuous carrying surface on the belt.

Referring to FIGS. 1-4, each of the contour rollers 28-33 has a peripheral groove 84 therein, resulting in an arcuate concave surface conforming generally to the contour of the strand 16. The rollers are spaced above the conveyor belt 72 in longitudinal alignment therewith. The pressure rollers 28-31 cooperate with the conveyor belt in propelling the strand therebetween. The strand is conveyed evenly and in accurate alignment to the casing separator assembly 36.

Referring to FIGS. 5-8, the casing separator assembly 36 includes a mounting arm 86 having one end pivotally mounted on the back of the side plate 24 by a pivot pin 88. A leaf spring 87 optionally is mounted on the back of the side plate, and it biases the arm upwardly. A mounting pin 90 is fixed to the free end of the arm, and it extends through an arcuate slot 92 in the side plate, having a radius from the pivot pin axis. A mounting sleeve 94 is rotatably adjustably secured to the mounting pin on the front side of the side plate by a set screw 96. A plate frame member 100 is clamped at one end to the mounting sleeve by a washer 102 and a screw 104 in threaded engagement with the sleeve. The frame member extends over the conveyor belt 72 in the direction of the oncoming sausage strand 16.

A roller pin 106 is fixedly mounted in a corresponding opening in the leading end of the frame member 100. A strand follower roller 108 is rotatably mounted on the roller pin. The roller includes halves 108a and 108b mounted on opposite sides of the frame member 100 and secured on the pin by locking rings 110 in suitable grooves in the pin. The roller halves are grooved to provide a concave arcuate peripheral surface 112 on the roller, which receives a strand 16 therein.

An air tube 114 is mounted on the frame member 100, being secured thereto as by soldering, and the tube terminates in a separating nozzle 116 extending in the direction of the oncoming strand 16 thereabove. An insertion spoon 118 having a shank 120 and a head 122 is fixedly mounted on the end of the air tube over the nozzle. The air tube is inserted through a corresponding opening in the shank, and the spoon extends over and in front of the nozzle in the direction of the oncoming strand. The spoon head 122 is a small oval-shaped terminal portion of the spoon, and it may have a slight upward curvature, as shown, or be flat. The bottom of the spoon head is slightly below the bottom of the nozzle as mounted.

The nozzle 116 and spoon 118 are mounted to extend within the groove or the concavity of the rollers 108, with the leading head 122 of the spoon extending beyond the roller axis towards the oncoming strand 16. With the mounting arm 86 pivotally mounted on the side plate 24, the parts are mounted for up and down movement, to and from the sausage strand. The roller is contoured to receive the strand between the sides of the concave surface 112, so that the roller rides on the strand as it advances. The roller supports the spoon head closely adjacent to and slightly spaced above the upper surface of the strand, more particularly of the sausages 18 therein, with the bottom of the nozzle 116 slightly above the bottom of the spoon head.

A triangular knife blade 124 having an upwardly and rearwardly inclined cutting edge 126 is removably mounted on the frame member. The leading end of the knife blade is received in a corresponding slot 128 in the spoon shank 120. The trailing end of the knife blade is received between the washer 102 and the frame member 100 and is removably secured in place by the screw 104.

Referring to FIGS. 11-16, the casing removal apparatus 38 includes a rotatable vacuum drum 140, a vacuum breaker 142, a vacuum chamber 144, and a drum drive sprocket 146. The apparatus is mounted on the side plate 24 and cooperates therewith.

The vacuum drum 140 includes a mounting unit 148 and a perforated sleeve 150 thereon. The mounting unit includes a cylindrical shaft having adjacent small and large diameter sections 152 and 156. A keyway 154 is provided at the outer end of the small section. A circular hub 158 having a greater diameter than the large shaft section is secured to the outer end thereof. A disk 160 having a greater diameter than the hub is secured to the outer face of the hub. The sleeve 150 is a tubular member having rows of spaced apart perforations or holes 162 extending entirely around its periphery. One end of the sleeve is received tightly over the hub 158 and secured thereto by suitable means, such as tack welds 164.

The vacuum breaker 142 includes a circular disk 166 and a semicircular shoe 168. The disk is provided with a central shaft opening 170 having a diameter slightly greater than that of the large shaft sections 156, four vacuum holes 172 spaced from the shaft opening, and two screw holes 174 spaced from the shaft opening and from the vacuum holes. The shoe 168 is mounted on one surface of the disk, between the rim of the disk and the holes therein. The outside diameter of the shoe corresponds to the inside diameter of the vacuum drum sleeve 150.

The side plate 24 is provided with a shaft opening 176, four vacuum holes 178 spaced outwardly therefrom, two tapped breaker mounting holes 180 spaced outwardly from the shaft opening, and two tapped vacuum chamber mounting holes 182 spaced outwardly from the shaft opening. The shaft opening 176 has a diameter slightly greater than that of the small shaft section 152. The vacuum holes 178 have the same diameter as the breaker vacuum holes 172. The vacuum breaker 142 is mounted on the side plate by a pair of screws 184 which extend through the screw holes 174 in the breaker and into the tapped holes 180 in the side plate. The shaft opening 170 and the vacuum holes 172 in the vacuum breaker disk 166 then register respectively with the shaft opening 176 and the vacuum holes 178 in the side plate.

The vacuum drum 140 is mounted by inserting the small shaft section 152 through the shaft opening 170 in the vacuum breaker and the shaft opening 176 in the side plate, where it is journaled in a bearing 186 (see FIG. 13). The large shaft section 156 is received loosely within the breaker shaft opening 170. The breaker shoe 168 is received closely within the drum sleeve 150 and substantially abuts on the hub 158. The drum sleeve substantially abuts on the breaker disk 166.

The vacuum chamber 144 includes a duct-like conduit 188 and a similar end closure member 190. The conduit includes a closed end 192 and an open end 194. The closure member includes a closed end 196 and an open end 198. The closure member is secured to the open end of the conduit by screws 200, to provide an inlet opening 202. The conduit includes two screw holes 204 arranged for alignment with the tapped holes 182 in the side plate, and a shaft opening 206 arranged to register with the shaft opening 176 in the side plate. The vacuum chamber is secured to the side plate by screws 208 inserted through the conduit holes 204 into the side plate tapped holes 182.

The small shaft section 152 of the vacuum drum is received in the conduit shaft opening 206 and journaled in a bearing 208 therein (see FIG. 13). The vacuum holes 178 in the side plate are enclosed by the sides and end of the conduit. The closed end 196 of the closure member 190 abuts on the bottom of the side plate, thereby forming an enclosed space 210 between the side plate and the conduit, which communicates with the inlet opening 202. As seen in FIGS. 1 and 2, a vacuum tube 212 is mounted in the inlet opening and connected to a suitable vacuum source, not shown.

The small shaft section 152 of the vacuum drum projects from the vacuum chamber conduit 188. The drum drive sprocket 146 is mounted on the projecting end of the shaft, by means of a key 214 inserted in the keyway 154 and a set screw 216 extending through the sprocket. The drive sprocket is coupled with the coupling sprocket 56 on the drive shaft 50 by a link chain 218. In this manner, the conveyor 26 and the vacuum drum 140 are driven synchronously by suitable drive mechanism connected to the main drive sprocket 54. The sprocket sizes are selected to rotate the vacuum drum at a peripheral speed equal to the conveyor belt speed.

In operation, a sausage strand 16 is supplied to the peeler head 14. It is preferable to cut the strand through the first sausage 18, to simplify engagement with the casing separator asesmbly 36. An operator threads the strand between the conveyor belt 72 and the pressure rollers 28–30 and into engagement with the casing separator assembly. The spoon 118 is inserted into the first sausage 18 and raised to the casing 20 on the upper surface. Compressed air, e.g., at about 20 p.s.i.g., is supplied to the air tube 114 and the separating nozzle 116 thereon and to the spreader nozzle 40. Vacuum or reduced pressure is applied to the vacuum tube 212. The machine is placed in operation, to drive the main drive sprocket 54 and thus the conveyor belt 72 and the vacuum drum 140.

The compressed air delivered by the separating nozzle 116 expands the casing 20, separating it from the sausages 18 for a distance ahead of the spoon 118, for ten to twenty sausage lengths depending on the air pressure and the adhesion to the sausages. After the strand has traveled a short distance under the separator assembly, the roller 108 engages the sides of the strand and rides thereon to support the assembly with the spoon spaced slightly above the sausages. The roller adjusts the position of the asesmbly to the sausage diameter, which in the case of frankfurters can vary as much as two millimeters during a typical day's run. The air jet from the separating nozzle flows beneath the spoon head 122, to support or lift the spoon in a stream of air, particularly when the spoon closely approaches the sausages, and thereby minimize scoring damage.

As the sausage strand is advanced by the conveyor belt, the spoon 118 raises the casing for access of compressed air thereto, as illustrated in FIGS. 5 and 7. The spoon also serves to thread the casing over the knife blade 124, and the casing is split longitudinally by the knife edge 126, as illustrated in FIG. 8.

As the spoon 118 encounters each valley between successive sausages 18, the spoon head 122 is held up by the roller 108. As the roller next reaches the valley, the spoon tends to dip, but the air flows beneath the spoon head suspends the spoon and counteracts the dipping tendency, to avoid scoring the sausages. The optional mounting arm spring 87 also minimizes dipping and cooperates to enable use of minimal air pressure. The spring is more adaptable to use when the casing is relatively loose on the sausages.

As the sausage strand 16 having a split casing 20 passes between the vacuum drum 140 and the guide roller 33 thereabove, an air jet is directed at the top of the strand by the spreader nozzle 40, to spread apart the split casing (see FIGS. 2 and 4). The vacuum drum is in vacuum communication with the casing through the drum perforations, at the bottom of the strand. The combined action of the air jet on one side of the casing and the vacuum or reduced pressure on the opposite side of the casing causes the casing to lay flat on the vacuum drum. The drum firmly rolls the casing away from successive sausages 18, thus peeling the casing from the sausages.

The casing adheres to the drum for about one-half revolution, or 180 degrees. The vacuum then is broken by the breaker shoe 168, which covers the drum perforations 162 over the remaining one-half of each revolution. The casing separates from the drum and is discharged as waste, as illustated in FIG. 1. The sausages are discharged over the discharge roller 42 and are collected in the receptacle 22.

The invention thus provides an improved machine for continuously removing the casing from a linked strand of sausages, which removes the casing effectively and reliably and which minimizes sausage scoring. The peeler head in the machine is a narrow compact unit adapted for use in multiple to process a number of parallel strands, simultaneously, as they are discharged from a sausage linking machine.

While a preferred embodiment of the invention has been described and illustrated, it will be apparent to those skilled in the art that various changes and modifications may be made within the spirit and scope of the invention.

We claim:

1. A machine for removing the casing from a linked strand of sausages enclosed in a separable casing, casing separating means including an air nozzle and a spoon extending over and in front of said nozzle for insertion between said casing and said sausages, and means mounting said separating means for movement to and from said sausages, whereby said spoon may be suspended within said casing in a stream of air from said nozzle.

2. A machine as defined in claim 1 including a contour roller having a peripheral groove thereabout mounted on said mounting means to ride on said sausage strand and support said separating means, said nozzle and spoon projecting across the roller groove with the leading end of said spoon extending beyond the roller axis.

3. A casing separator assembly for a machine for removing the casing from a linked strand of sausages enclosed in a separable casing which comprises a frame member, an air nozzle and a spoon extending in front of said nozzle for insertion between said casing and said sausages, said nozzle and spoon being mounted on said frame member with the spoon extending over the nozzle for suspending the spoon in a stream of air from the nozzle, and a strand follower mounted on said frame member to ride on said sausage strand and support the assembly.

4. An assembly as defined in claim 3 including a cutting edge mounted on said frame member to the rear of said nozzle and spoon, and wherein said strand follower comprises a contour roller having a peripheral groove thereabout, said nozzle and spoon projecting across the roller groove with the leading end of the spoon extending beyond the roller axis.

5. A casing separator assembly for a machine for removing the casing from a strand of sausage enclosed in a separable casing, said assembly comprising a frame member adapted to be pivotally mounted on the machine, a roller rotatably mounted adjacent one end of said frame member to support said frame member on the strand, and a separator means adapted for insertion between the casing and the sausage, said separator means being fixed to said frame member adjacent said one end thereof and projecting subjacent said roller whereby movement of said roller away from the strand results in proportional movement of the separator means in the same direction.

6. A machine as defined by claim 5 further including a vacuum drum including a drum periphery adapted to contact the casing after splitting to direct the same to a collection area and means for interrupting vacuum to the drum periphery after a partial revolution thereof.

References Cited
UNITED STATES PATENTS

| | | |
|---|---|---|
| 2,424,346 | 7/1947 | Wilcoxon. |
| 2,636,213 | 4/1953 | Fedevich. |
| 2,725,591 | 12/1955 | Cline et al. |
| 2,779,968 | 2/1957 | Hensgen. |
| 3,312,995 | 4/1967 | Garey. |

LUCIE H. LAUDENSLAGER, Primary Examiner

U.S. Cl. X.R.

17—49